June 17, 1958 — M. B. STEINTHAL — 2,839,406
COMBINED INFUSION DEVICE, DRIP TRAY AND PACKAGE
Filed March 23, 1953
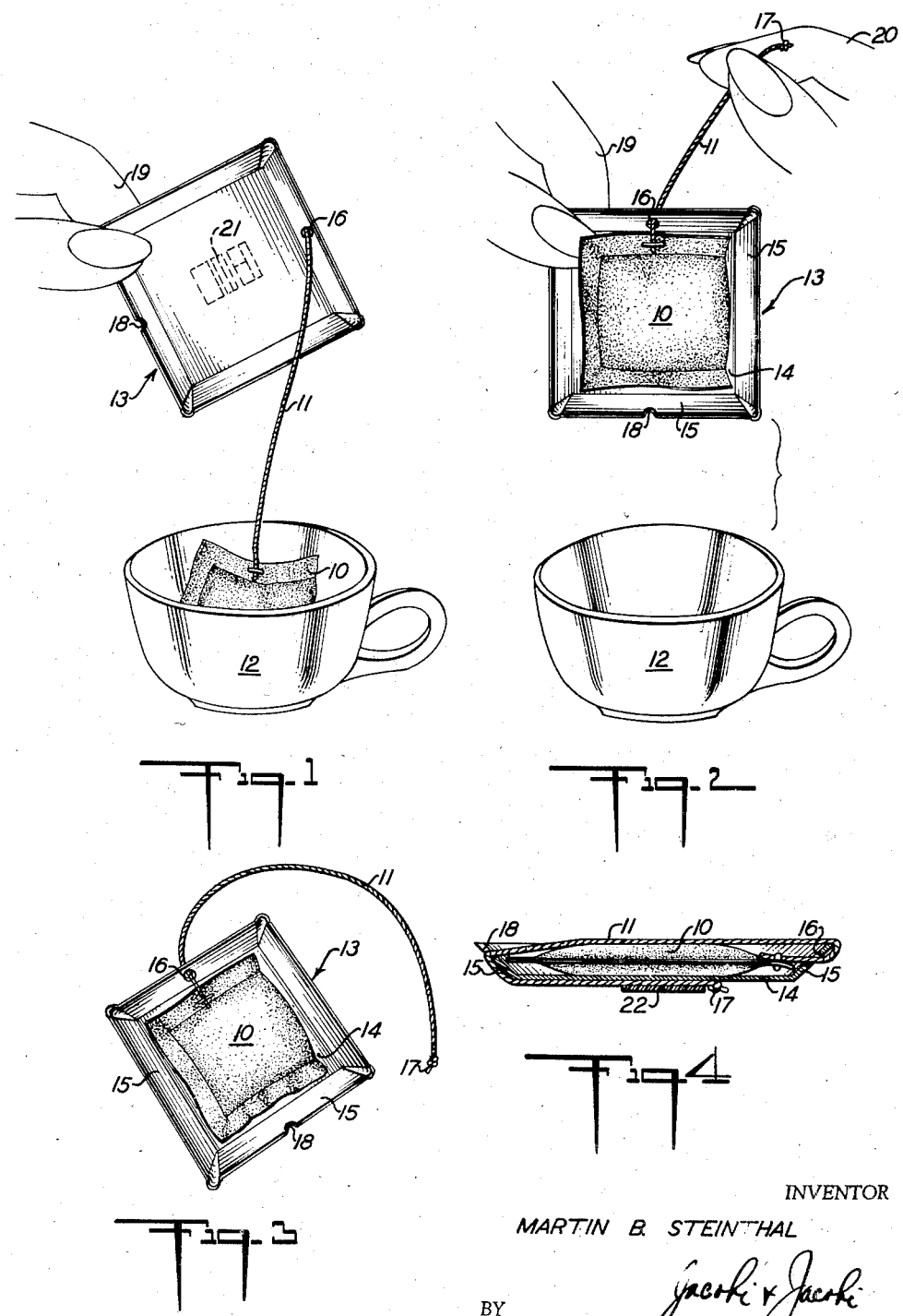
INVENTOR
MARTIN B. STEINTHAL

United States Patent Office 2,839,406
Patented June 17, 1958

2,839,406

COMBINED INFUSION DEVICE, DRIP TRAY, AND PACKAGE

Martin B. Steinthal, New York, N. Y.

Application March 23, 1953, Serial No. 344,162

2 Claims. (Cl. 99—77.1)

This invention relates to the culinary arts and more particularly to a device for preparing a beverage by infusion.

Heretofore, many infusion devices in the nature of tea bags have been developed and utilized and, as is well known, these bags are commonly placed in a cup or other container of hot water for a sufficient time to allow the water to permeate the bag and produce a cup of tea by infusion from the tea contained in the bag.

Upon completion of this operation it has been common practice to remove the bag from the cup or other container by a flexible element such as a string attached to the bag, such bag thereafter being placed in the saucer or other receptacle to prevent drippage of liquid onto the table or other supporting surface.

In spite of ordinary care the bag will often swing at the end of its supporting string, resulting in drops of liquid staining the tablecloth or table and very often through inadvertence a receptacle for receiving the saturated bag will not be provided. This results in confusion and often in inadvertent spillage or drippage of liquid from the bag which frequently causes damage to the tablecloth or support furniture.

It is accordingly an object of this invention to provide a device for preparing a beverage by infusion in which means is combined therewith to receive the liquid permeable container and prevent unwanted drippage of liquid therefrom.

A further object of the invention is the provision of a device for preparing a beverage by infusion in which a liquid proof tray is associated with a flexible element supporting the liquid permeable container whereby such container may be conveniently withdrawn into nesting relationship with the tray and thereafter placed on a supporting surface without danger of drippage from the container.

A still further object of the invention is the provision of a device for preparing a beverage by infusion including a drip tray which in conjunction with the flexible supporting element for the liquid permeable container provides a unitary package.

Another object of the invention is the provision of a device for preparing a beverage by infusion in which a drip tray is combined with the flexible supporting element of the liquid permeable container in such a manner that the container may be removed from a cup or other receptacle and received within the confines of the tray while suspended above such cup or receptacle.

A further object of the invention is the provision of a device for preparing a beverage by infusion in which a drip tray is combined with the flexible element supporting the liquid permeable container and in which such tray may be formed by a simple die-stamping operation from relatively inexpensive liquid proof material resulting in a device which may be sold in a highly competitive market.

A still further object of the invention is the provision of a device for preparing a beverage by infusion in which a drip tray of liquid proof paper or other suitable material is combined with the flexible element for supporting the liquid permeable container and in which advertising or other desired indicia may be applied to the tray.

Further objects and advantages of the invention will become apparent from the following description taken in conjunction with the accompanying drawings wherein:

Fig. 1 is a perspective view showing the container and tray just prior to removal of the container from a cup;

Fig. 2, a view similar to Fig. 1, showing the container raised from the cup to a position overlying the tray;

Fig. 3, a perspective view showing the container after use and supported in the tray in a manner to prevent damage to surrounding objects by liquid from the saturated container; and Fig. 4, a transverse sectional view showing the manner in which the container and tray are assembled to form a unitary package.

With continued reference to the drawing there is shown a liquid permeable container 10 which may be formed of paper, cloth or other suitable material and to which is attached a flexible supporting element such as a string 11. The container 10 and supporting element 11 are of well known conventional construction and are commonly sold as tea bags.

When it is desired to prepare a cup of tea or other beverage by infusion, the container 10 is immersed in liquid contained in a cup or other suitable receptacle 12 for a sufficient time to permit proper preparation of the beverage. Upon completion thereof, it has been customary to remove the container 10 from the cup 12 by grasping the flexible element 11 and thereafter depositing the saturated container 10 in the saucer or other receptacle provided therefor. However, as is well known, the container 10 often swings at the end of the flexible element 11 resulting in drippage of liquid onto the tablecloth, table or other furniture which often disfigures or damages the same, even though normal care may be taken.

In order to preclude such damage there is provided by this invention a drip tray 13 which as shown in the drawing, is generally rectangular in configuration but which of course, may be made in any desired shape. Tray 13 may be formed by a simple die-stamping operation from liquid proof paper or other suitable material and is provided with a bottom wall 14 and upstanding marginal flanges 15 forming a continuous rim.

An aperture 16 is provided in one of the marginal flanges and the flexible element 11 passes through aperture 16 and is provided on the opposite side thereof, with a knot or other suitable enlargement 17 which is too large to pass through the aperture 16. The opposite marginal flange is provided with a notch 18, the purpose of which will be presently described. As will be seen from an inspection of Figs. 2, 3 and 4, the tray 13 is somewhat larger than the container 10 in order that the same may be completely received within the confines of the rim formed by the marginal flanges 15.

The operation of the device of this invention is best shown in Figs. 1, 2 and 3 and as shown in Fig. 1, the container 10 has remained in the cup 12 a sufficient time to complete preparation of the beverage and the container 10 must be removed therefrom. In this operation the tray 13 is grasped by the fingers 19 of one hand and by raising the tray 13 a sufficient distance, the container 10 is suspended above the cup 12 and free liquid may be allowed to drip into the cup. When such drippage has substantially ceased, the knot 17 or other portion of the flexible element 11 above the tray 13 is grasped by the fingers 20 of the other hand and the flexible element 11 pulled upwardly through the aperture 16, until the container 10 is received within the confines of the rim formed by the marginal flanges 15 of the tray 13. At this time, the tray and saturated container 10 may be placed on the table or other supporting surface as shown in Fig. 3, and any further drippage from the container 10 will be retained in the tray 13. This of course, prevents any damage to the supporting surface by liquid from the container 10.

The invention also contemplates the provision of advertising or other indicia 21 on the upper surface of the bottom of the tray 13 and the nature of the invention further permits the convenient provision of a unitary package forming a convenient article of commerce.

As best shown in Fig. 4, the container 10 nests within the confines of the marginal flanges 15 of the tray 13 and the flexible element 11 may be disposed over the edge of the flange 15 containing the aperture 16, over the container 10 and through the notch 18 in the opposite flange. The flexible element 11 then passes beneath the tray 13 and may be tightly but removably secured to the lower surface of the bottom of the tray 13 by a gummed label 22 overlying the flexible element 11 and engaging the tray 13. If desired however, the flexible element 11 may be secured to the tray 13 by an adhesive or by any other suitable means which permits convenient detachment of the same, merely by grasping and pulling the knot 17. Upon such detachment the device is ready for use in preparing a beverage as described above.

Obviously the container 10 and tray 13 may be made in any desired shape and of any desired material and the knot 17 may be replaced by a bead or other suitable enlargement which will prevent passage of the flexible element 11 through the aperture 16 beyond a predetermined point.

It will be seen that by the above described invention there has been provided a relatively simple and inexpensive device to permit preparation of a beverage by infusion and thereafter to prevent drippage of liquid which will result in damage to adjacent furniture or other objects. The device likewise, provides for the display of advertising or other indicia and at the same time, provides a convenient unitary package which adds little to the cost of such devices and yet materially improves the convenience of operation and prevents undesirable consequences as the result of carelessness or improper handling of the device.

It will be obvious to those skilled in the art that various changes may be made in the invention without departing from the spirit and scope thereof, and therefore, the invention is not limited by that which is shown in the drawing and described in the specification, but only as indicated in the appended claims.

What is claimed is:

1. A device for preparing a beverage by infusion and for preventing drippage of liquid comprising in combination a liquid permeable container, a substance in said container for infusion with liquid upon immersion therein, a flexible supporting element secured to said container, a tray of liquid proof paper of substantially the same shape as said container and slightly larger, upstanding marginal flanges on said tray providing a continuous rim, an aperture in one flange slidably receiving said supporting element and a knot on the outer end of said element to limit movement of said element through said aperture in one direction whereby, said tray may be grasped in the fingers of one hand and said element in the fingers of the other hand and by upward movement of said element through said aperture, said container may be raised from a cup of liquid into position within the rim of said tray and said tray and said container placed on a supporting surface with drippage from said container collecting in said tray.

2. A device as defined in claim 1, in which the flange opposite said aperture is provided with a notch in the edge thereof, said container being disposed in said tray, the free end of said flexible element passing over said container, through said notch and beneath said tray and releasable means securing said element to said tray to provide a unitary package.

References Cited in the file of this patent

UNITED STATES PATENTS

| | | |
|---|---|---|
| 2,199,406 | Jablon | May 7, 1940 |
| 2,284,087 | Ferguson | May 26, 1942 |
| 2,285,113 | Eaton | June 2, 1942 |
| 2,334,156 | Hansen | Nov. 9, 1943 |